(12) United States Patent
Hale et al.

(10) Patent No.: US 6,732,180 B1
(45) Date of Patent: May 4, 2004

(54) METHOD TO INHIBIT THE IDENTIFICATION AND RETRIEVAL OF PROPRIETARY MEDIA VIA AUTOMATED SEARCH ENGINES UTILIZED IN ASSOCIATION WITH COMPUTER COMPATIBLE COMMUNICATIONS NETWORK

(75) Inventors: John C. Hale, Broken Arrow, OK (US); Gavin W. Manes, Dallas, TX (US)

(73) Assignee: The University of Tulsa, Tulsa, OK (US)

( * ) Notice: Subject to any disclaimer, the term of this patent is extended or adjusted under 35 U.S.C. 154(b) by 621 days.

(21) Appl. No.: 09/634,084

(22) Filed: Aug. 8, 2000

(51) Int. Cl.⁷ .................... G06F 15/173; G06S 15/16
(52) U.S. Cl. ............... 709/229; 709/203; 709/213; 705/51; 705/57; 707/9; 713/200
(58) Field of Search ............... 709/201, 224, 709/225, 229, 203, 213

(56) References Cited

U.S. PATENT DOCUMENTS

| | | | |
|---|---|---|---|
| 5,040,217 A | 8/1991 | Brandenburg et al. | 381/47 |
| 5,285,498 A | 2/1994 | Johnston | 381/2 |
| 5,481,614 A | 1/1996 | Johnston | 381/2 |
| 5,548,724 A * | 8/1996 | Akizawa et al. | 709/203 |
| 5,579,430 A | 11/1996 | Grill et al. | 395/2.12 |
| 5,799,141 A * | 8/1998 | Galipeau et al. | 714/13 |
| 5,935,246 A * | 8/1999 | Benson | 713/200 |
| 6,003,030 A * | 12/1999 | Kenner et al. | 707/10 |
| 6,366,907 B1 * | 4/2002 | Fanning et al. | 707/3 |
| 6,560,614 B1 * | 5/2003 | Barboy et al. | 707/201 |
| 2001/0042073 A1 * | 11/2001 | Saether et al. | 707/203 |
| 2001/0044807 A1 * | 11/2001 | Kleiman et al. | 707/203 |

OTHER PUBLICATIONS

Doug Lichtman, "Anonymity a Double–Edge Sword for Pirates On–Line", Chicago Tribune, p. 1.25, Apr. 13, 2000.*
Doug Lichtman, "Letters to Fortune: Stopping up Napster", Fortune, v141, n11, p. 28, New York, May 29, 2000.*
Matthew Wollacott, "Web Spoofing Poses New Security Threat", Infoworld, v19, n1, p. 33(1), Jan. 6, 1997.*

* cited by examiner

*Primary Examiner*—Hosain Alam
*Assistant Examiner*—David Lazaro
(74) *Attorney, Agent, or Firm*—Head, Johnson & Kachigian

(57) ABSTRACT

A method and article of manufacture to inhibit automated search engines in locating and retrieving proprietary media by employing cooperative scanning, manufacturing, sharing and supervisory control software processing components to replicate, and make available for sharing, decoy media in such numbers to render media search engines ineffectual. The invention's scanning processing component searches media sharing network communities for illegally shared proprietary media and its manufacturing processing component constructs decoy media files mimicking identified proprietary media. The invention's share processing component associates media sharing network communities with shared media sets containing decoy media files, and its supervisory control processing component provides for system initialization and checking subprocesses which establish initial configurations, and reactive behavior of the invention in addition to monitoring the effectiveness of a decoy ratio interactively specified by a user of the invention.

16 Claims, 9 Drawing Sheets

METHOD TO INHIBIT THE IDENTIFICATION AND RETRIEVAL OF PROPRIETARY MEDIA VIA AUTOMATED SEARCH ENGINES UTILIZED IN ASSOCIATION WITH COMPUTER COMPATIBLE COMMUNICATIONS NETWORK

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates generally to automated information processing systems, and more particularly, to a method and article of manufacture to deter and inhibit the use of search engines in locating and retrieving proprietary media throughout a computer compatible communications network.

BACKGROUND OF THE INVENTION

The proliferation of digital formats and compression technologies for audio and video has shaped primarily the Internet, but other computer accessible communication networks as well, as conduits for worldwide sharing of music, movies, software, and digital information (in the instance of the Internet). Thanks to digitization and perceptual coding techniques, files, without limitation, containing entire songs and even feature-length films can be easily transmitted over wide-area networks and internetworks such as the Internet.

MPEG-1 Audio Layer-3 (MP3) is a technology for compressing audio data into a standard format, while preserving sound quality. MP3's perceptual coding technology can shrink digital audio data by a factor of 12 without sacrificing any sound quality. Thus, it is practical to transfer audio content encoded as MP3 files over computer networks. Other applications called "rippers" permit users to extract audio from compact discs and store extracted audio content on hard drives, where they can be transformed by an "encoder" application into the MP3 format. Furthermore, such "encoder" and "ripper" processes have recently been bundled into "1-Step" software, making duplication and distribution of MP3 files even simpler.

MP3 files are commonly available on the World Wide Web (WWW) for downloading using conventional browsers. Non-limiting examples of such browsers would include, but not be limited to Microsoft's Internet Explorer and Netscape's Communicator. Moreover, numerous special network client applications, including Napster, Gnutella and Scour Exchange, now exist, engaging powerful search engines to make sharing, distributing and locating MP3s (and other forms of digital media) even more convenient. This confluence of technology, particularly the powerful media search engines used in client software, has fostered the development of anonymous network communities, whose users are primarily engaged in the illegal sharing of proprietary media.

For example, Napster uses a client-server architecture to share media over the Internet and a Napster client permits users to log on to a server, to add media (i.e., MP3 files) to be recorded to Napster's global index, and to search the global Napster index for sought after shareable media.

For purposes of disclosure and discussion, reference will be made to a media sharing community such as, but not limited to, a Napster media sharing community. As will be discussed, the present invention's disclosure and claims extend far beyond the limitations of one specific media sharing community such as Napster and address other such communities including but not limited to Gnutella and Scour Exchange. It is expressly intended by the inventor that the term "Napster" as discussed herein is provided solely for illustrative and descriptive purposes and not intended to be construed as a limitation of community type to which the benefits of the instant invention are to be extended. FIG. 1 illustrates the use of Napster like client-server network software utilized for locating and downloading media. A login process 1.03 entails launching Napster client software on a computer, which in turn registers the user as active in the Napster community. The registration protocol dictates that a Napster client send a list of MP3 files shared by the client along with client host information used to establish download connections to a Napster server. The login process assists in maintaining an active global index for media shared by Napster clients over the Internet. The logout process 1.06 removes client media records from the global index. Searching for media in Napster is a three-step process: (1) The user issues a query, e.g., a string such as "Metallica," to the Napster client search engine interface 1.09, which forwards the request to the Napster server 1.11. The Napster server 1.11 compares the query against its global index and returns a list of matching records to the requesting client (a.k.a. user) 1. 14. Record data typically includes the full title, artist name, as well as a Napster user-name, the network connection type and a ping-response time (to estimate data transfer latencies) for the individual sharing the MP3 file. The user then selects a file to download and a client-client network connection is made to transfer the media file from the remote client host 1.17. Note that downloading occurs directly between Napster clients. Consequently, the Napster server is not involved in the downloading process.

While Napster engages a predominantly centralized client-server network software architecture, Gnutella minimizes the role of centralized servers. Gnutella servers do not contain a global index of shared media. Rather, they only provide remote client addresses and connection data. A Gnutella client retrieves a list of clients actively sharing media from the server and polls them directly in a search.

FIG. 2 illustrates the operation of Gnutella network software. The login process for Gnutella clients registers client host identity with a Gnutella server 2.03. Unlike Napster servers, Gnutella servers maintain no index of shared media. Rather, they only contain DNS/IP address information. The server creates a "horizon" for new clients, which defines the other clients visible to them. A Gnutella client search polls other members the of the client's horizon directly for matches 2.05 and results are returned to the requesting client 2.07. The user can then select a file and location for download. The client then initiates a direct file transfer from the remote client 2.09. Further, media content broker servers such as, but not limited to Gnutella servers 2.03, provide services which allow users to continually receive evolving information related to their particular horizon 2.11. It is also important to note that Gnutella is not restricted to sharing digital audio. Video, software, text and other forms of digital information, irrespective of media content and type, can be shared as well.

Universities, corporations and other enterprises have sought technical means to reduce the potential for intellectual property right infringements committed on their networks and systems by blocking the use of Napster and other similar media sharing network clients. Absent the present invention, such blocking represents the only viable, technical solution towards preventing the unauthorized procurement copyright of proprietary media utilizing a shared communication's network. Typically, media sharing network clients are blocked at a firewall by filtering (discarding) key packets used in client-server or client-client communication protocols. For example, a firewall can be configured to discard outgoing packets sent to Napster servers, thus inhibiting local users from registering media. Similarly, a firewall can be configured to filter selected incoming packets to inhibit searching or downloading media files.

While blocking appears to be the lone technical solution to prevent the use of media sharing network software to facilitate unauthorized procurement of proprietary media, it has a number of drawbacks that limit its practicality and universal adoption. First, blocking the use of Napster and similarly intended network software may be overly restrictive. Indeed, there are legitimate uses for such applications—not every piece of shared media represents a copyright infringement in the making. Second, blocking is easily rendered ineffectual by improvements to media sharing software. Variants of Napster, Gnutella, and other similar software will integrate, and in some cases have already integrated features making their operation over the network less conspicuous and more difficult to restrict. For example, blocking schemes that rely on common ports used by media sharing network software can be foiled by port hopping and filters that check other protocol signatures or actual transmission contents can be circumvented by tunneling and encryption, respectively.

Consequently what is needed is a method and article of manufacture to render media search engines built into Napster, Gnutella, and other media sharing network clients unusable. This is accomplished via the instant invention's processing capabilities which provide for the systematic manufacture and sharing of decoy files resembling proprietary media. When the instant invention is properly deployed, a user searching of such media receives a high proportion of decoy hits. The instant invention's technology makes these decoy "hits" difficult to discern from real hits, and manifests lengthy download times to frustrate users and discourage use of search engines for desired media.

BRIEF SUMMARY OF THE INVENTION

The instant invention employs cooperative scanning, manufacturing, sharing and supervisory control software technology to share decoy media at a volume that renders media search engines ineffectual. These software processes can target proprietary media to inhibit illegal duplication and distribution over computer networks. Though disclosed, discussed and claimed in terms of Internet usage and the preclusion of sharing MP3files, it will be readily apparent to one skilled in the art that the benefits of the instant invention are not intended to be so restricted. Specifically, the present invention may be practiced over any computer compatible communications network such as, but not limited to, LANs, MANs, CANs, WANs and the Internet. Further, as discussed in association with MP3 files the present invention can be practiced to employ its cooperative scanning, manufacturing, sharing and supervisory control software technology to share any form of heretofore designed and yet to be developed media (a.k.a. file structures). Examples of file structures supporting media content upon to which the present invention may be directed would include without limitation text files, video files, audio files, any combination thereof as well as to be future developed file structures capable of interactive transference between client server, hardware and operating platforms. Lastly, such hardware and operating platforms are intended to include any and all operating and hardware platforms now existing or to be developed which are capable of processing the afore noted non-limiting files structures represented as proprietary media content. The instant invention is tunable and scalable. Media selections to be protected can be altered at will, and the level of protection (specified in terms of a decoy ratio) can be adjusted interactively and arbitrarily. The effective decoy ratio is calculated as the probability of any particular media file in a media sharing network community being a decoy. Due to the potential propagation effects of sharing decoy media, it is only practical to approximate the effective decoy ratio. By accounting for matching media files originating from the instant invention's share clients, a lower bound on the effective decoy ratio can be computing. This lower bound can be improved by tracking third party users that have downloaded and shared decoy media from the instant invention's clients.

The scanning process searches media sharing network communities for illegally shared proprietary media. The manufacturing process constructs decoy media files mimicking proprietary media. The share component joins media sharing network communities with shared media sets containing decoy media files. The supervisory control process is responsible for system initialization and checking subprocesses, which articulate initial configurations and reactive behavior of the system, and monitor the effective decoy ratio, respectively. These processes rely on interrelated of database repositories to coordinate system activity where a Media Protection Data Base (MPDB) contains media class protection descriptions and decoy media properties; a Media Manufacture Data Base (MMDB) contains records of decoy media to be manufactured and decoy media previously manufactured; a Media Server Data Base (MSDB) contains the actual decoy media files, a User Name Data Base (UNDB) contains a list of valid user account names, tagging those in use, for media sharing network communities, and a User Download Data Base (UDDB) records third party download activity between the instant invention's share clients to help compute more accurate effective decoy ratio approximations.

A primary object of the instant invention is to make search engines built into media brokering systems such as, without limitation, Napster and Gnutella ineffective, thus rendering them decidedly unuseable.

Another object of the instant invention is to provide an automated process for systematically sharing decoy files which resemble proprietary media.

A further object of the instant invention is to inhibit and deter unauthorized users to proprietary media, leaving legitimate uses unaffected.

An additional object of the instant invention is to provide for dynamic scaling and tuning where multiple sharing clients can be spawned at will, and at various locations on a Local Area Network, Wide Area Network, or the Internet with each client sharing an arbitrary selection and volume of media.

Other objects and further scope of the applicability of the present invention will become apparent from the detailed description to follow, taken in conjunction with the accompanying drawings wherein like parts are designated by like reference numerals.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many, changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The instant invention's protection system inhibits searches for proprietary media in media sharing network communities by strategically sharing decoy media.

Figure 1:
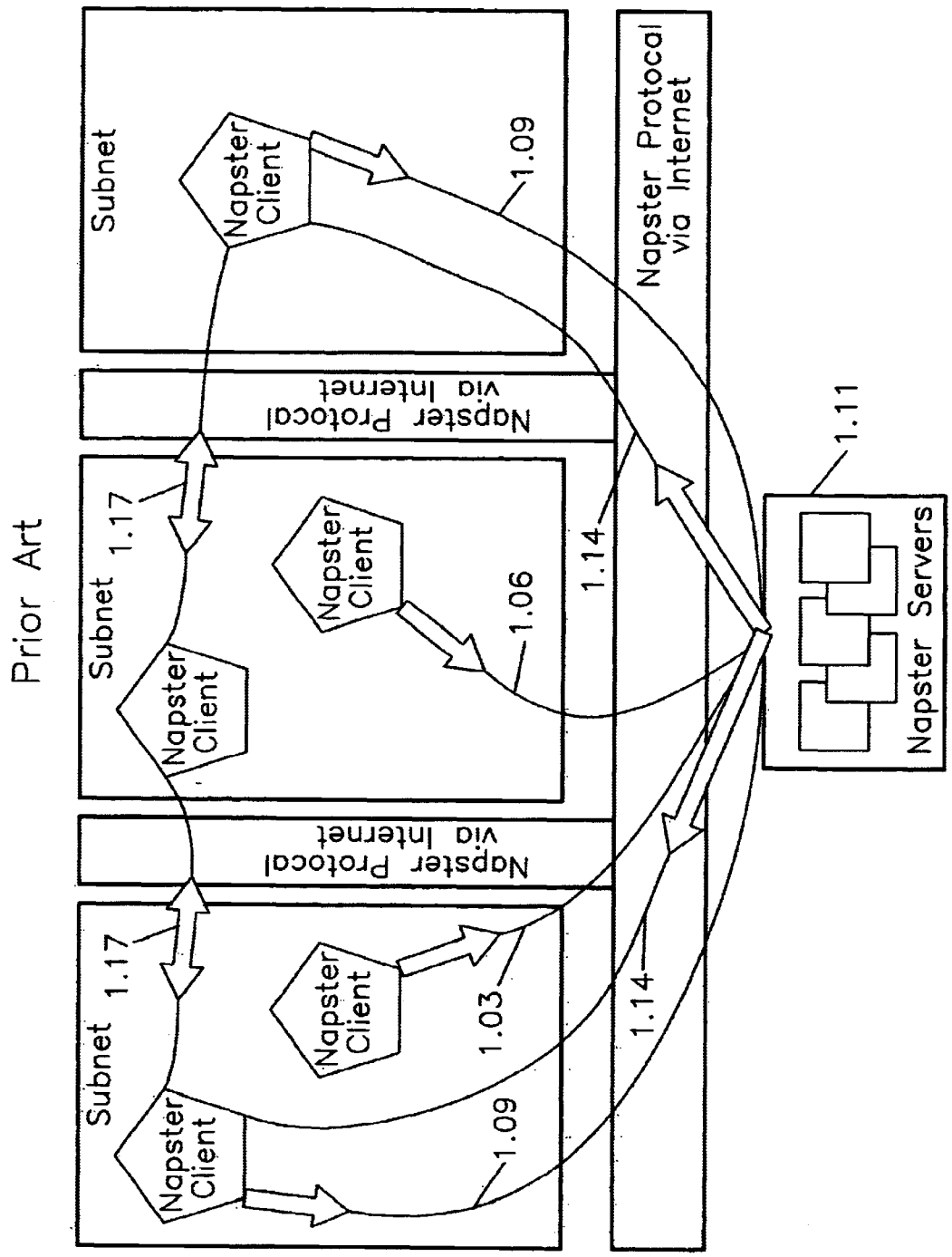
FIG. 1 illustrates a Napster type media sharing software architecture runtime model.
Figure 2:
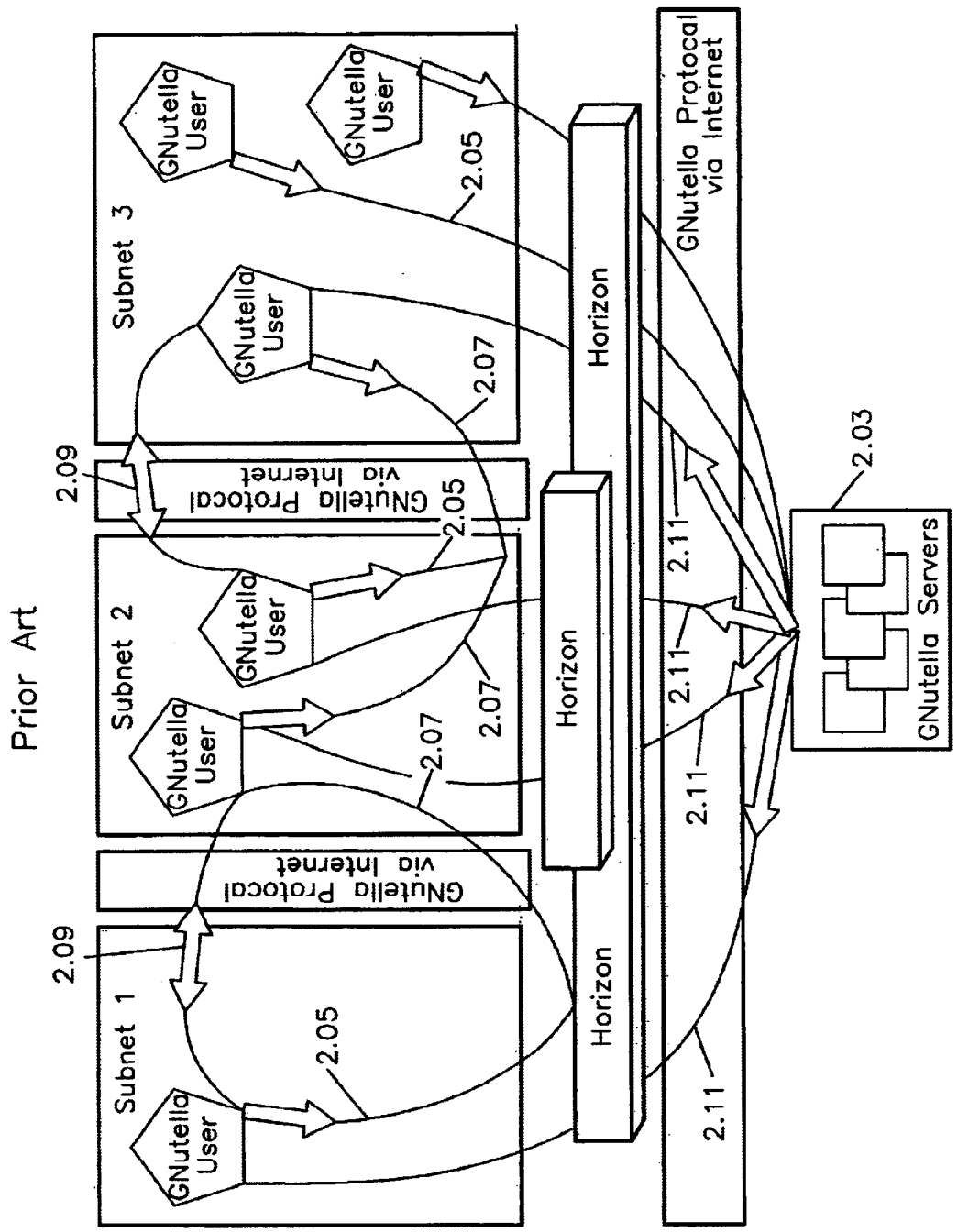
FIG. 2 illustrates a Gnutella type media sharing software architecture runtime model.
Figure 3:
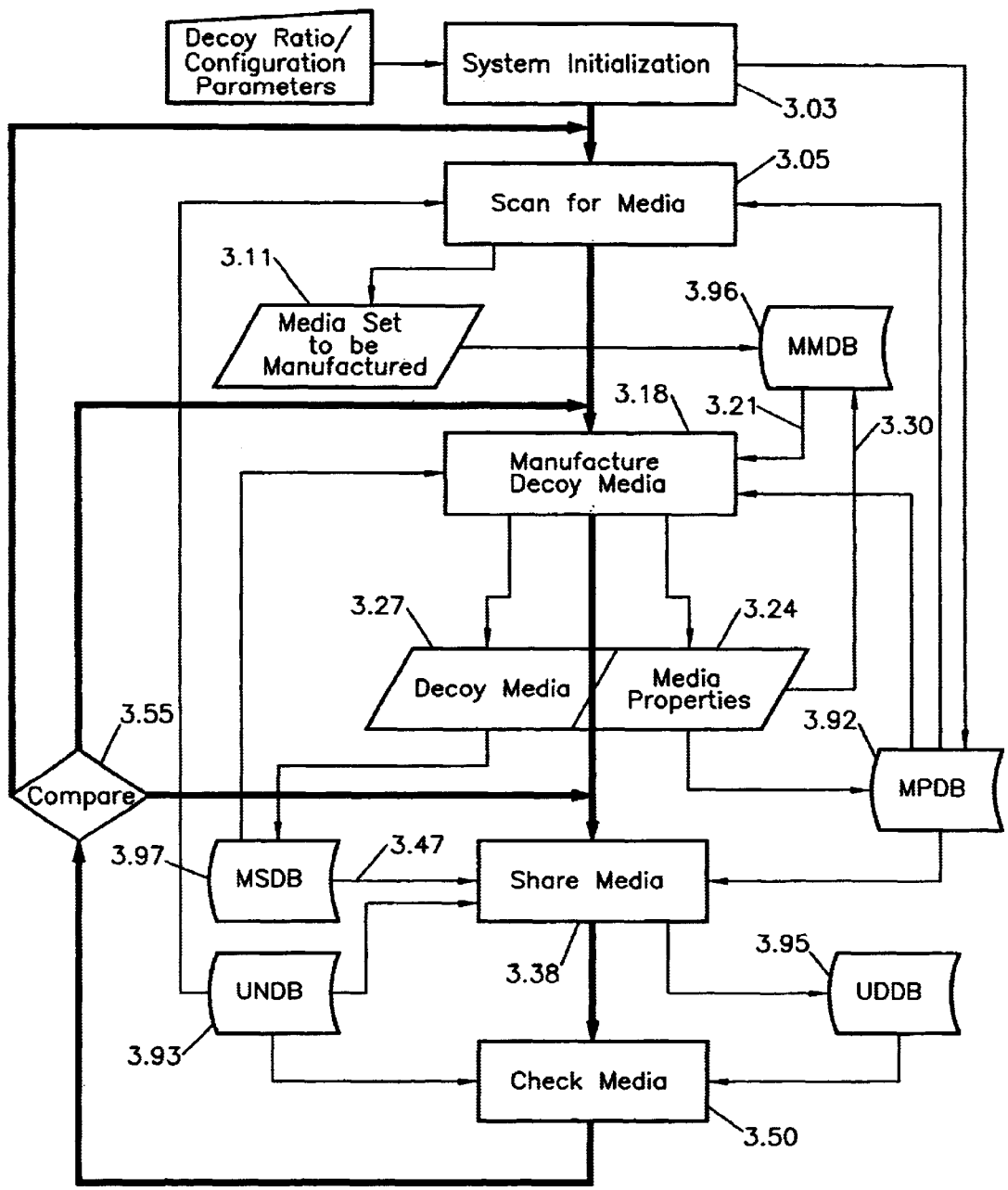
FIG. 3 is a process overview flowchart of the instant invention illustrating sub-component processing interrelationships.

FIG. 3 is a process overview flowchart of the instant invention illustrating the invention's sub-component processing interrelationships. The invention is best appreciated when viewed as five basic interrelated processing components; system initialization 3.03, scanning for media 3.05, manufacturing decoy media 3.18, sharing media 3.38, and checking system protection levels 3.50. Each component is later detailed with the exception of the initialization and check phases, which are collectively referred to as the supervisory control process. An alternative embodiment which is presented in the figures, is the linking of the initialization and check phases of the supervisory control process to create an iterative and reactive protection system.

The instant invention's processes make use of a collection of integrated databases to store and extract information about shared media, system configuration and optionally, third party download histories. A Media Protection Data Base (MPDB) 3.92 tracks classes of media to be protected and their associated properties. A Media Manufacture Data Base (MMDB) 3.96 stores data about specific media titles to be constructed and also holds information about those that have been constructed. A Media Server Data Base (MSDB) 3.97 serves as a repository for decoy media files to be shared by the instant invention. A User Name Data Base (UNDB) 3.93 keeps a list of valid user account names for the instant invention's clients in media sharing network communities and tracks those currently in use. A User Download Data Base (UDDB) 3.95 tracks the history of decoy media downloads between third parties and the instant invention's share clients.

Media protection class specifications, which express a set of media content to guard, are passed to the MPDB 3.92 for use in later components of execution. The form of a media protection class specification is that of a simple data structure for media properties. Such media properties include but are not limited to; (i) author/artist name, (ii) media title, (iii) file name, (iv) bit rate (a measure of the sampling quality of the media), and (v) file size. As a media sharing network community adheres to its own standard for publishing and recognizing various media properties, it is likely that media property information held in MPDBs will vary when implementing and targeting the instant invention different media sharing network communities. Property field entries within a MPDB 3.92 can be partially specified, making use of wildcards to denote a range of acceptable values. For example, a partial media class specification may wildcard all property fields except for the artist field, setting it to "Metallica." Such a specification would encompass all media produced by that particular artist. Fully specified media class structures, on the other hand, will refer and relate to a single and distinct media object.

Figure 4:
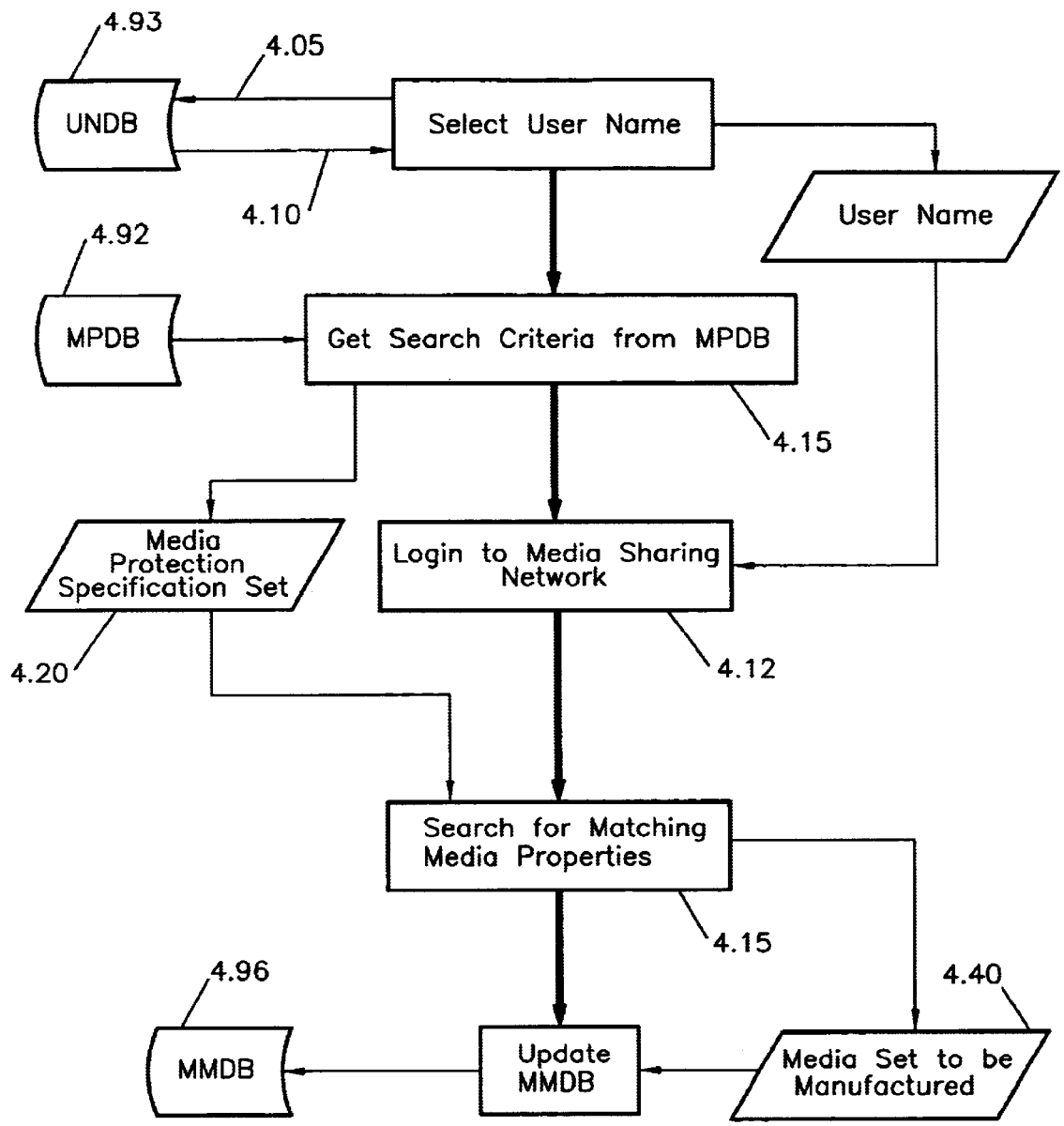
FIG. 4 is a flowchart for the instant invention's scan processing component.

As can be seen in FIG. 3, a system initialization process first accepts user input to specify media protection classes and quantitative objectives, and to configure reactive system behavior 3.03. Non-limiting examples of such classes and objectives would include satisfying target decoy rates, e.g., 80%, for protection classes encompassing single/multiple versions of a particular song, and artist and label catalogs. An invention scan component 3.05 then extracts a set of media protection classes from the MPDB 3.92 and retrieves a valid community user name from the UNDB 3.93 for logging into the media sharing network for the purpose of finding illegally shared elements relating to said specified media protection classes. The resulting media set, containing a collection of fully specified media property lists 3.11, is placed in the MMDB 3.96. The manufacture component 3.18 next retrieves media properties from the MMDB 3.96 of media to be fabricated 3.21. The twin outputs of the manufacture component are the resulting media properties 3.24 (which are typically identical to the media properties input to the process), and the actual media itself 3.27 (e.g., an MP3 file). This component also updates the MMDB 3.96 to track which media are manufactured 3.30. 20 Media properties are then recorded in the MPDB 3.92 with actual media files stored in the MSDB 3.97. The share component 3.38 retrieves a selection of decoy media to be shared from the MPDB 3.92, and assembles a collection of decoy media files matching the selection set from the MSDB 3.97. The share component also retrieves a valid name from the UNDB 3.93 for the purpose of logging into the network community to share the decoy media. User downloads are recorded in the UDDB 3.95 to help estimate decoy saturation levels, i.e., to approximate an effective decoy ratio. The Check Media component 3.50 compares target decoy hit rates versus computed hit rates. This step extracts a valid name from the UNDB 3.93, logs in to the media sharing network community to search for media selections based on criteria previously retrieved from the MPDB 3.92. By comparing user names in the matching search list against the instant invention's names found in the UNDB 3.93 and names in the UDDB 3.95 of other users who downloaded decoys 3.27, estimates of the actual decoy ratio can be computed and compared against target decoy ratios. Based on the results of this comparison, control from this process may be passed to any of the previous processes in the flowchart sequence. FIGS. 4 through 8 present and discuss each of the invention's sub-processing components in further detail. Turning now to FIG. 4.

Scanning

The invention's scan component is utilized to define a set of decoy media selections to manufacture from media protection class specifications and is described in association with FIG. 4. In FIG. 4 the scanning processing component begins by reading media class protection parameters from the MPDB 4.92 which contains media protection class specifications for use as search criteria to assess the volume and quality of proprietary media available in the media sharing network community. The resulting search criteria can optionally undergo an expansion process to account for misspellings and variations designed to avoid detection by automated means.

Once a set of search criteria is constructed, the UNDB 4.93 is queried for a valid name, with a retrieved user name used to login into the shared media network community 4.12 for the purpose of searching for proprietary media that falls within one of the media protection classes 4.15. The search 4.15 is performed using communication protocols and search engine interfaces supported directly by the shared media network community. The UNDB 4.93 is referenced to cross-check and eliminate from consideration hits associated with decoy media.

Each remaining media selection from the resulting search set is mapped to the partial media protection class specification to which it belongs 4.20. Together, the media selection 4.05 and the partial specification 4.20 are used to generate multiple media templates to be used in the manufacture of decoy media 4.40. Fields in the media templates matching wildcards in the associated partial specification are filled by sampling a range of legal values the particular domain. For example, a partial media protection specification with a wildcarded bit rate field associated with a media selection returned from a search could result in the creation of three media templates all with identical media properties, except for the bit rate field which could be sampled at 96, 128 and 140 kbps for the templates.

Media templates contain full specifications of decoy media to be manufactured and shared by the instant invention with each template stored in the MMDB 4.96 and tagged as waiting to be manufactured 4.40. Scanning can be a continual process that frequently runs to update the MMDB 4.96 with new media available on the sharing network.

Manufacturing

Figure 5:
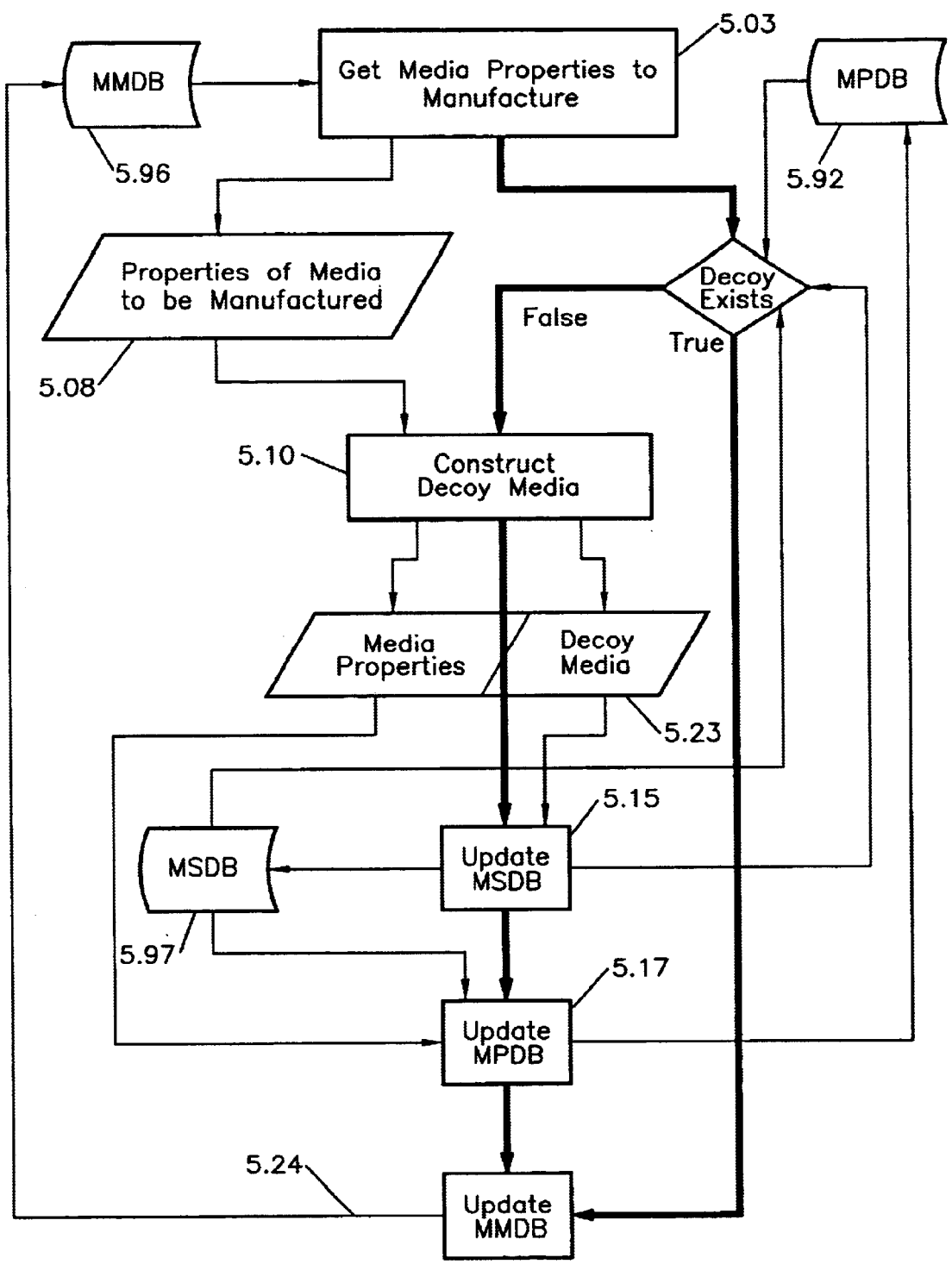
FIG. 5 is a flowchart for the instant invention's manufacture processing component.

FIG. 5 presents a flowchart for the instant invention's manufacturing processing component. The objective of the instant invention's manufacture process is to construct decoy media files with identical properties to their copyrighted counterparts. This process begins by extracting a collection of media property sets from the MMDB 5.96 describing a collection of decoy media files to be constructed 5.03.

The process then creates media files 5.03 with file names, extensions and sizes matching those extracted from the property sets pulled from the MMDB 5.96. The actual content of the decoy media can assume various forms. Typical content for decoy media can include, without limitation; white noise, degraded versions of proprietary media, warnings of the legal consequences of sharing copyrighted media, advertisements and other desired decoy media.

While this technique presupposes that decoy media files are created in the same digital format as their valid, proprietary counterparts, this is not to be considered a limitation of the instant invention. Decoy files only need to match the file name, extension and size associated with the proprietary media file. However, streaming technology may permit real-time analysis of digital media formats by checking blocks of data as they are received. Matching the actual format for decoy media in this case has the advantage of producing a better decoy.

The decoy media files are then constructed 5.10 with and stored in the MSDB 5.97 with foreign keys linking back to the MPDB records 5.17. The MPDB 5.92 at this point contains media property records matching the constructed decoy media files 5.23. Thus, MPDB records are associated in the system with decoy media designed to protect the classes they represent. These records are tagged to denote that a decoy now exists for that particular media selection 5.15. Finally, MMDB records are updated to denote generated media 5.24.

Sharing

Figure 6:
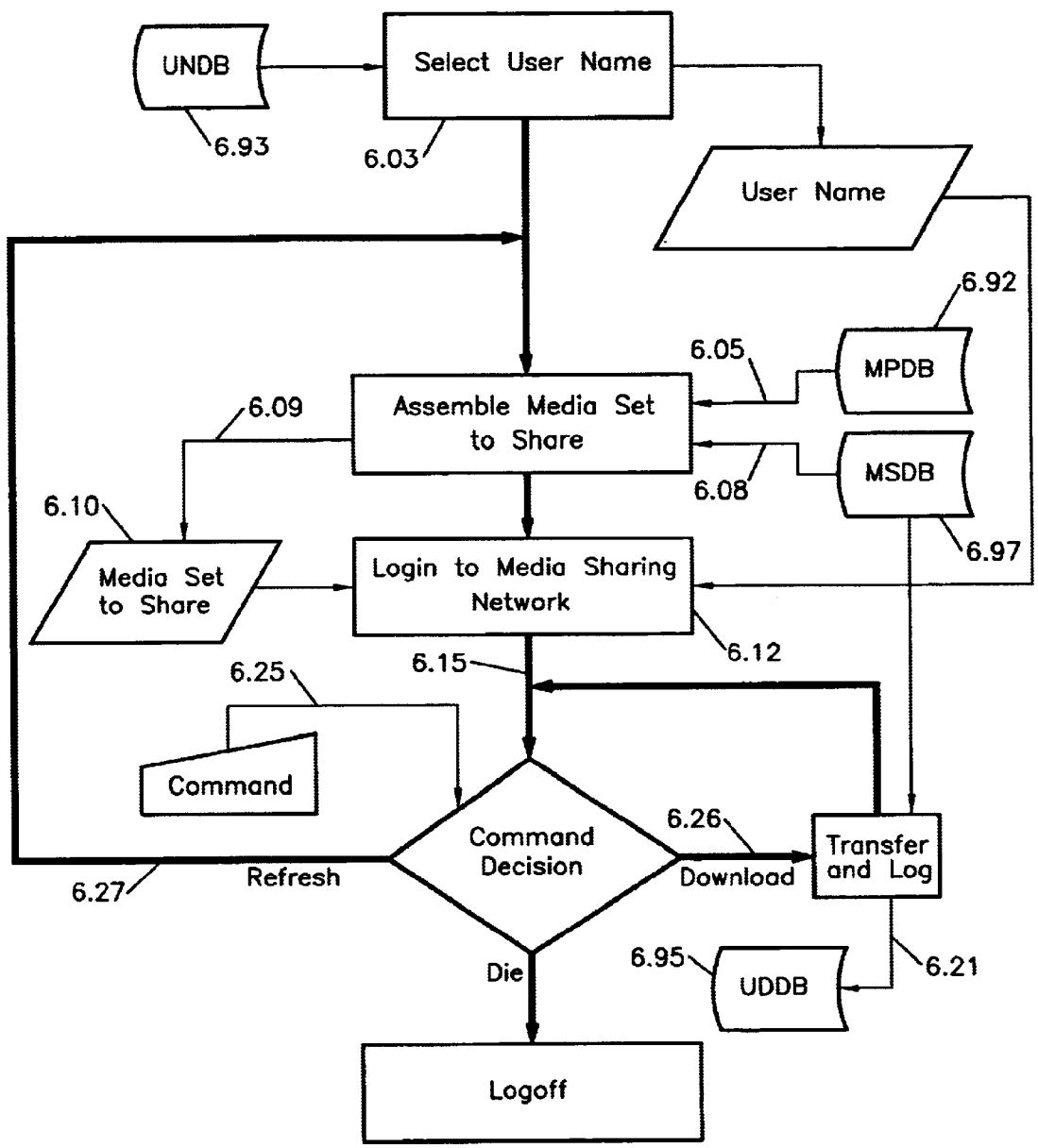
FIG. 6 is a flowchart for the instant invention's share component.

FIG. 6 is a flowchart for the instant invention's Sharing process component. The instant invention's share component facilitates the distribution and propagation of decoy media within media sharing network communities and is described in association with FIG. 6. This process begins with the selection of a valid media sharing network community account name 6.03 from the UNDB 6.93 under which to join the community.

Next, media to protect are retrieved 6.05 from the MPDB 6.92. The MPDB 6.92 is queried to extract properties of the protected media to enable the construction of the shared media sets. The MPDB 6.92 also contains a foreign key link into the MSDB 6.97 pointing to the decoy media files associated with the appropriate MPDB media protection records.

Following links from the MPDB 6.92, the decoy media files are retrieved 6.08 from the MSDB 6.97. Alternative strategies for building shared media sets include 'soft-linking' files (as opposed to copying) from the MSDB 6.97, although this technique may incur additional network latency penalties during media transfers. The benefits of soft-linking include a centralized, easily managed repository of decoy media. Regardless of location or physical distribution strategies, shared media sets should be available for download to create a more effective decoy environment.

A decoy media set folder 6.10 is next constructed 6.09 and the share component continues with a login to the media sharing network community 6.12. This procedure uses the account name selected earlier in the invention's share component to register as a legitimate member of the network community. The protocol for logging in and establishing a presence in the media sharing network is identical to that for other members in the community.

Once the login process is completed, the invention's share processing component accepts input from two basic sources; (i) members of the media sharing network community 6.15 and (ii) the instant invention's supervisory control processes. Media sharing network community members issue download requests 6.26 to the invention's share components as if they were regular sharing clients in the community, i.e., obeying the same protocols as those download requests issued to other members of the community. Media transfer occurs as it would between any two community members. An optional activity in the media transfer subprocess is to log all information 6.21, including the user account name and location of the community members downloading decoy media. This information is stored in the UDDB 6.95 and provides secondary data in computing an effective decoy ratio approximation.

The instant invention's supervisory control processes may also issue commands 6.25 to share clients. These commands instruct the instant invention's share clients to; (i) die, i.e., logout and terminate, or (ii) refresh the shared media set 6.27. In the case of a refresh command, control in the share component returns to the stage responsible for polling the MPDB 6.92 for links media sets to protect. At this point the shared media set is regenerated to include new media to protect and/or to exclude specified media files.

Supervisory Control

Figure 7:
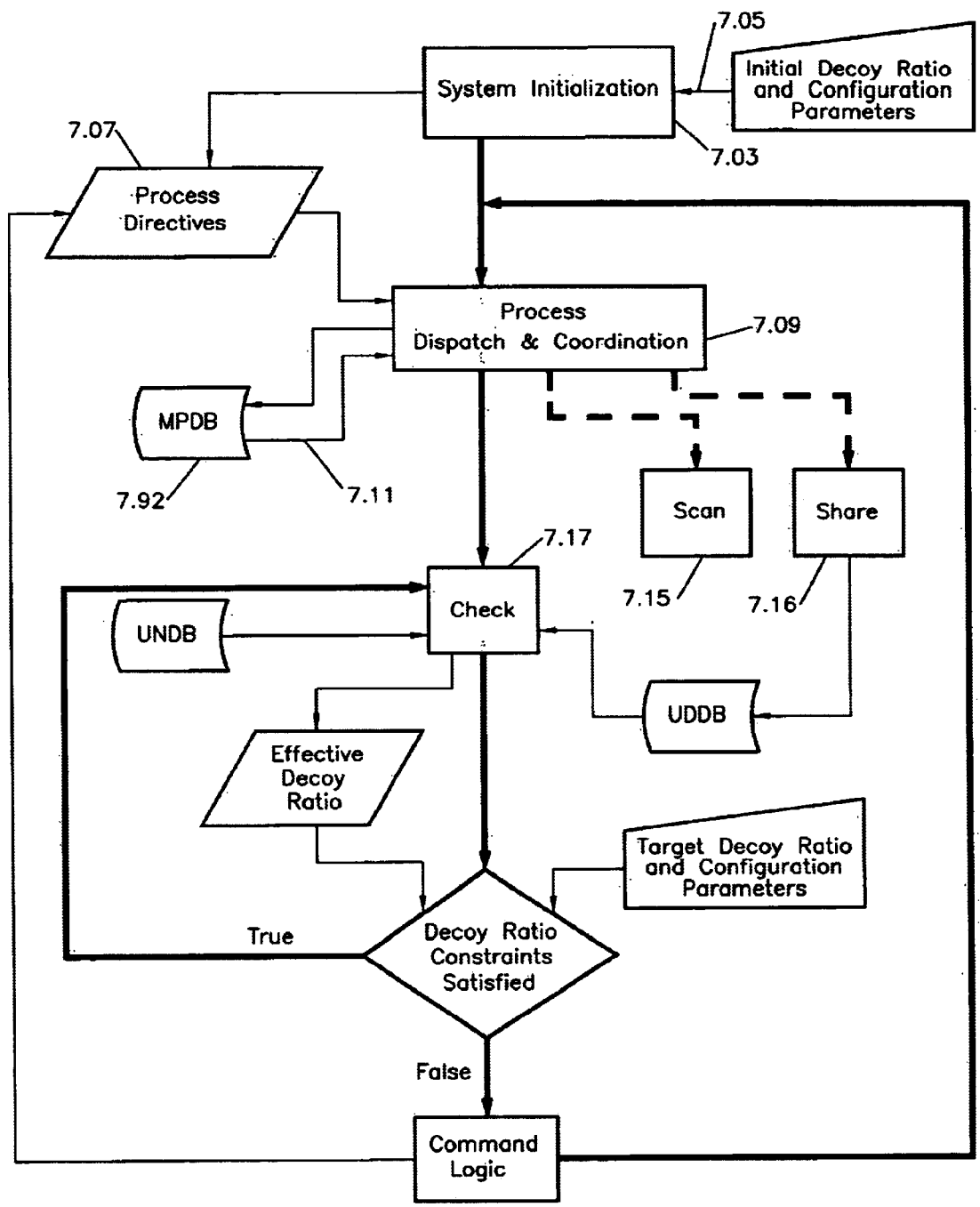
FIG. 7 is a flowchart for the instant invention's supervisory control processing component.

The supervisory control process and its connection to the rest of the instant invention's media protection process is illustrated in the flowchart in FIG. 7. The invention's supervisory control process oversees system initialization, management and decoy ratio analysis. The system initialization function 7.03 accepts user input dictating target decoy ratios 7.05. For example, an initial protection goal may express a target decoy ratio of 65% for a protection class mapped to the partial specification "Artist=Band X." Other configuration parameters capping computational and network resources, such as target decoy ratios, CPU usage, hard drive allocation, bandwidth consumption, target decoy ratio ramping, share client camouflage techniques, client mobility and migration patterns, dedicated to the instant invention's protection system can also be entered at this point. Initial user input can also express reactive process behavior, e.g., relating a protection strategy path that ramps target decoy ratios up or down in 5% intervals, based on effective decoy ratio approximations.

From this initial input a batch of process directives 7.07 is formed to marshal system resources. These directives are interpreted and acted on in the process dispatch and coordination phase 7.09. For example, a process directive can mandate the concurrent deployment of the instant invention's share clients over a Wide Area Network and/or scanning for a collection of media protection classes. This step also includes extracting media protection classes 7.11 from the MPDB 7.92. At this point, system processes and resources are encumbered for potentially concurrent executions of scan 7.15, share 7.16 and check 7.17 process components. If the target decoy ratio exceeds the effective approximation, reactive behavior rules are passed into command logic, which generates new directives based upon the passed behavior rules for the instant invention's scan, share and check processes. Control is then returned to the process dispatch and coordination subprocess. The invention's check process is further disclosed in association with FIG. 8.

Figure 8:
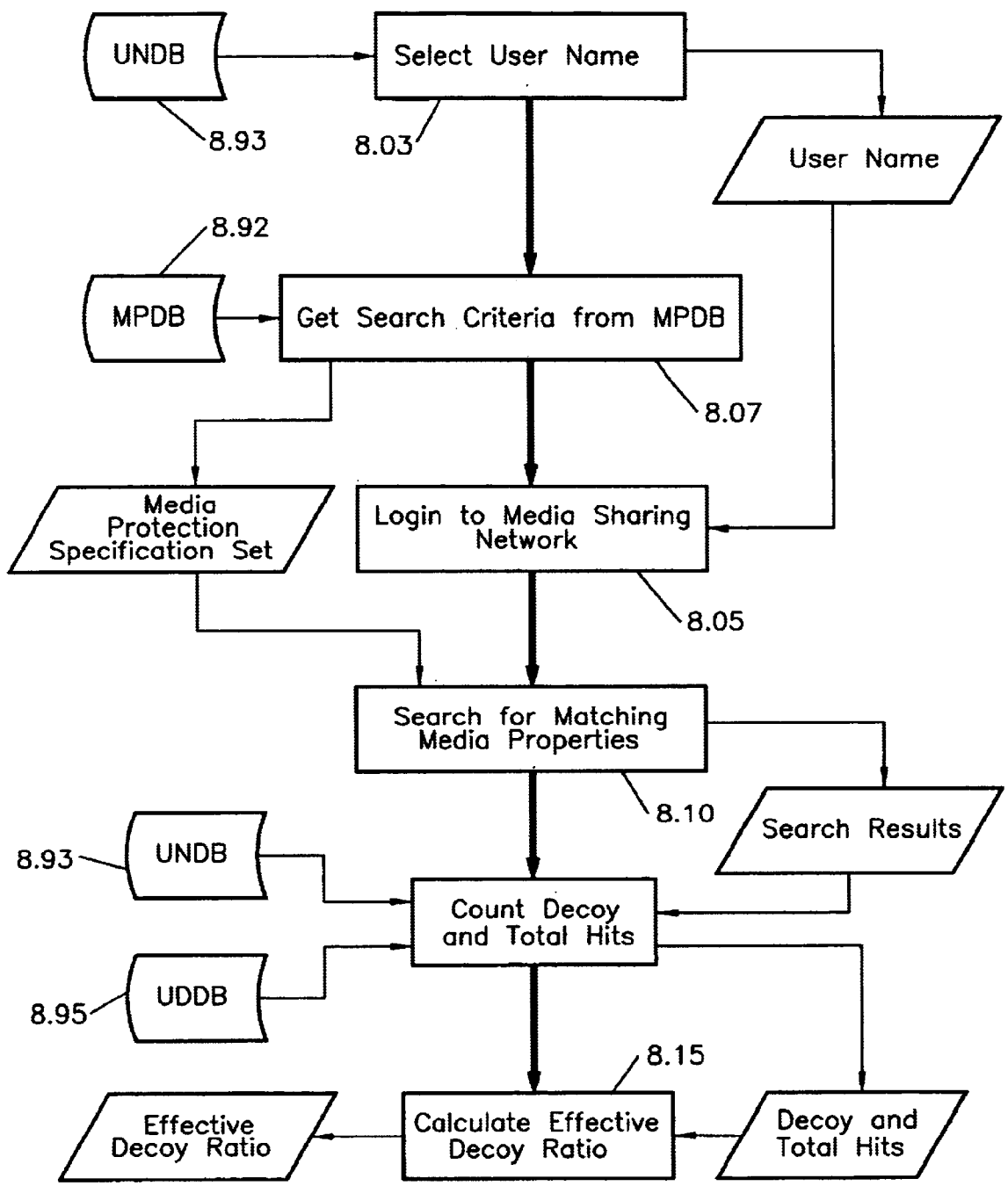
FIG. 8 is a flowchart for the instant invention's check processing component.

As seen in FIG. 8, the check process approximates the effective level of protection for a media class. The check process extracts a valid user name 8.03 from the UNDB 8.93 to login to the media sharing network community 8.05. Once the login is completed, the check process can initiate searches to assess effective decoy ratios. In so doing, media protection classes are retrieved from the MPDB 8.92 to focus media searches 8.07. The present invention's user names are also extracted to filter decoy media hits out of the search results. Moreover, the invention's UDDB 8.95 is consulted to consider first-order decoy sharing effects in approximating effective decoy ratios. User names listed in the UDDB 8.95 are matched to external users who have downloaded decoy media directly from the instant invention. This information is then factored into effective decoy ratio approximations. For any given media protection class, the effective decoy ratio, E, is computed as:

$$E=D/T,$$

where T represents the total number of search hits returned and D represents the number of hits determined to be decoy media. T is determined directly from the results of the media search. D can be computed as:

$$D=M+U,$$

where M is the number of search hits coming from the instant invention's share clients and U is the number of hits coming from shared media network community users found in the UDDB 8.95.

A simple decision process compares the target decoy ratio with the effective approximation 8.15. If the effective decoy ratio approximation exceeds the target decoy ratio specified by the user (which can be periodically adjusted), then no reactive measures need be taken, and the supervisory control process resets the check process after a specified period of time.

Figure 9:
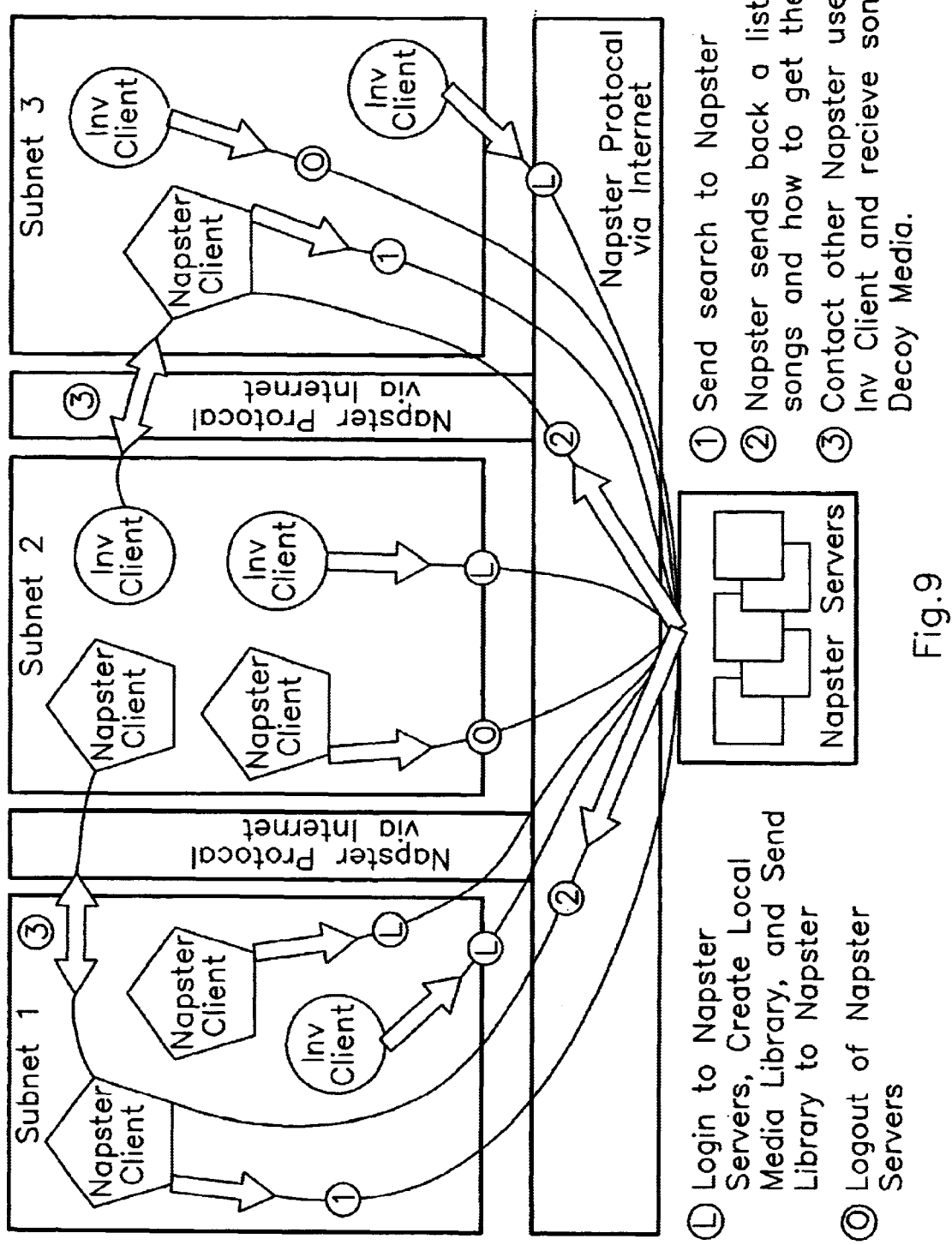
FIG. 9 is a self describing runtime overview of the instant invention when engaged in protecting proprietary media in a Napster tape media sharing community.

FIG. 9 presents a runtime view of the instant invention's implementation targeting a Napster type community on the a computer compatible network, such as the Internet, (other invention's components are not pictured) where the invention's clients appear as regular Napster clients to members of the Napster community, but engage the instant invention's process implementations to flood Napster communities with decoy media. The invention's supervisor continually executes the scanning, manufacturing, and other instant invention's processes to ensure that media in the MPDB 8.92 are constantly protected. This is a silent detail of the invention's implementation because Napster type communities evolve rapidly, permitting instantaneous addition and deletion of media from global indexes.

Given some initial assumptions, the effective decoy ratio can be approximated from details in FIG. 9. Turning now to FIG. 9 and with continuing reference to FIG. 8.

Assume that each regular Napster user shares 10 songs that are from the artist Band X and that Band X appears in the MPDB 8.92 specifying a 50 percent target decoy ratio for all of its music. When the invention is launched, the invention's Supervisor initiates the invention's Scanner to search for media in protection classes specified in its MPDB 8.92, including media recorded by Band X. The invention's Scanner logs onto Napster using a name from the UNDB 8.93, searching for songs by Band X (as dictated by Napster parameters found in the MPDB 8.92). It finds 50 hits in the community of media recorded by Band X (10 songs from 5 Napster users). The invention's Scanner places corresponding property information in the MMDB, and continues scanning.

The manufacturing phase of the inventions is identical to the instant invention's process illustrated in FIG. 5. Media decoys are generated with specifications satisfying media properties found in the MMDB and placed in the MSDB. To achieve the 50 percent target decoy ratio the invention's Supervisor injects 5 Flood (Share) clients into the Napster community, which are instructed to share the manufactured decoys of the ten songs found earlier.

The invention's Checker executes constantly, continually approximating effective decoy ratios. Soon after the invention's share clients become active, the Checker will locate 5 Napster users sharing 10 songs each and 5 invention's clients sharing 10 songs each. The Checker can distinguish between these two classes of community members by referring to the UNDB 8.93 to verify which names are in use by invention's share clients. Hence, the effective decoy ratio is approximated as $E=D/T$, where $D=M+U=5$ (ignoring the propagation effects embodied by the U term) and $T=10$ (the total number of Band X search hits). Thus, $E=5/10=0.5$, and the effective decoy ratio has currently satisfied its target, and therefore no immediate response is required.

PREFERRED EMBODIMENT

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

ALTERNATE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described herein above is amenable for execution on various types of executable mediums others than a memory device such as a random access memory. Other types of executable mediums can be used, such as but not limited to, a computer readable storage medium which can be any memory device, compact disc, or floppy disk.

What is claimed is:

1. A method to inhibit the identification and retrieval of proprietary media via automated search engines, utilized in association with computer compatible communications networks, said method comprising:

identifying at least one media protection class within which the identification and retrieval of proprietary media via automated search engines is to be inhibited;

accessing a media sharing computer compatible communications network and identifying shared media properties comparable to said identified media protection class;

manufacturing at least one shared decoy media file comparable to said identified shared media properties and making said decoy file accessible to said media sharing network and automated search engines executed in association therewith;

evaluating the effectiveness of said shared decoy media file in inhibiting the identification and retrieval of proprietary media via said automated search engines; and interactively modifying process configuration parameters to influence the effectiveness of inhibiting said identification and retrieval of proprietary media via said automated search engines.

2. The method as set forth in claim 1 wherein said identifying at least one media protection class further comprises the step of identifying at least one process configuration parameter which includes a partial media class specification to yield media protection templates.

3. The method as set forth in claim 1 wherein said step of identifying shared media properties comparable to said identified media protection class further comprises the steps of enumerating said identified media properties as a resulting media set and storing said media set in a media manufacture database.

4. The method as set forth in claim 2 wherein said step of identifying at least one media protection class further comprises the step of identifying at least one process configuration parameter chosen from a configuration group including, target decoy ratios, target decoy ratio ramping, share client camouflage techniques, client mobility and migration patterns.

5. The method as set forth in claim 1 wherein said step of manufacturing of said shared decoy media file further comprises the steps of storing of said file content in a media server database and linking properties describing said file in a media protection database to a plurality of media databases.

6. The method as set forth in claim 1 wherein said step of making said decoy file accessible to said media sharing network and automated search engines executed in association therewith further comprises the steps of retrieving a selection parameter set of decoy media to be shared from a media protection database; assembling a collection of decoy media content files matching said selected parameter set, and retrieving a valid user name from a user name database to log on to a network community and make said decoy media content available to other network community users.

7. The method as set forth in claim 1 wherein said step of evaluating the effectiveness of said shared decoy media file in inhibiting the identification and retrieval of proprietary media via said automated search engines comprises the steps of:

retrieving a valid user name from a user name database to log on to a media sharing network community and retrieving media protection classes from a media protection database to structure media searches;

referencing a user download database to factor first-order decoy media sharing effects when approximating decoy ratios;

matching user names in a user download database to determine those users who have downloaded decoy media; and factoring said retrieved name, referenced database, and matched names to produce effective decoy ratio approximations.

8. A computer readable medium encoded with a computer program to inhibit the identification and retrieval of proprietary media via automated search engines, utilized in association with computer compatible communications networks, said program comprising:

a code segment for identifying at least one media protection class within which the identification and retrieval of proprietary media via automated search engines is to be inhibited;

a code segment for accessing a media sharing network and identifying shared media properties comparable to said identified media protection class;

a code segment for manufacturing at least one shared decoy media file comparable to said identified shared media properties and making said decoy file accessible to said media sharing network and automated search engines executed in association therewith;

a code segment for evaluating the effectiveness of said shared decoy media file in inhibiting the identification and retrieval of proprietary media via said automated search engines; and a code segment for interactively modifying process configuration parameters to influence the effectiveness of inhibiting said identification and retrieval of proprietary media via said automated search engines.

9. The computer program as set forth in claim 8 wherein said identifying at least one media protection class further comprises identifying at least one process configuration parameter which includes a partial media class specification to yield media protection templates.

10. The computer program as set forth in claim 8 wherein said identifying shared media properties comparable to said identified media protection class further comprises collating said identified media properties as a resulting media set and storing said set in a media manufacture database.

11. The computer program as set forth in claim 9 wherein said at least one process configuration parameter is chosen from a configuration group including, target decoy ratios, target decoy ratio ramping, share client camouflage techniques, client mobility and migration patterns.

12. The computer program as set forth in claim 8 wherein said manufacturing of said shared decoy media file further comprises the storing of said file content in a media server database and the linking properties describing said file in a media protection database to a plurality of media classes.

13. The computer program as set forth in claim 8 wherein said making said decoy file accessible to said media sharing network and automated search engines executed in association therewith further comprises retrieving a selection parameter set of decoy media to be shared from a media protection database; assembling a collection of decoy media content files matching said selected parameter set, and retrieving a valid user name from a user name database to log on to a network community and make said decoy media content available to other network community users.

14. The computer program as set forth in claim 8 wherein said code segment for evaluating the effectiveness of said shared decoy media file in inhibiting the identification and retrieval of proprietary media via said automated search engines further comprises:

retrieving a valid user name from a user name database to log on to a media sharing network community and retrieving media protection classes from a media protection database to structure media searches;

referencing a user download database to factor first-order decoy media sharing effects when approximating decoy ratios;

matching user names in a user download database to determine those users who have downloaded decoy media; and factoring said retrieved name, referenced database, and matched names into effective decoy ratio approximations.

15. A method to inhibit the identification and retrieval of proprietary media via automated search engines, utilized in association with computer compatible communications networks, said method comprising:

identifying at least one media protection class within which the identification and retrieval of proprietary media via automated search engines is to be inhibited;

accessing a media sharing computer compatible communications network and identifying shared media properties comparable to said identified media protection class;

manufacturing at least one shared decoy media file comparable to said identified shared media properties and making said decoy file accessible to said media sharing network and automated search engines executed in association therewith;

evaluating the effectiveness of said shared decoy media file in inhibiting the identification and retrieval of proprietary media via said automated search engines including the steps of retrieving a valid user name from a user name database to log on to a media sharing network community and retrieving media protection classes from a media protection database to structure media searches;

referencing a user download database to factor first-order decoy media sharing effects when approximating decoy ratios;

matching user names in a user download database to determine those users who have downloaded decoy media;

factoring said retrieved name, referenced database, and matched names to produce effective decoy ratio approximations; and interactively modifying process configuration parameters to influence the effectiveness of inhibiting said identification and retrieval of proprietary media via said automated search engines.

16. A computer readable medium encoded with a computer program to inhibit the identification and retrieval of proprietary media via automated search engines, utilized in association with computer compatible communications networks, said program comprising:

a code segment for identifying at least one media protection class within which the identification and retrieval of proprietary media via automated search engines is to be inhibited;

a code segment for accessing a media sharing network and identifying shared media properties comparable to said identified media protection class;

a code segment for manufacturing at least one shared decoy media file comparable to said identified shared media properties and making said decoy file accessible to said media sharing network and automated search engines executed in association therewith;

a code segment for evaluating the effectiveness of said shared decoy media file in inhibiting the identification and retrieval of proprietary media via said automated search engines which includes:

retrieving a valid user name from a user name database to log on to a media sharing network community and retrieving media protection classes from a media protection database to structure media searches;

referencing a user download database to factor first-order decoy media sharing effects when approximating decoy ratios;

matching user names in a user download database to determine those users who have downloaded decoy media; and factoring said retrieved name, referenced database, and matched names into effective decoy ratio approximations; and a code segment for interactively modifying process configuration parameters to influence the effectiveness of inhibiting said identification and retrieval of proprietary media via said automated search engines.

\* \* \* \* \*